United States Patent [19]

Lynch et al.

[11] Patent Number: 4,540,751

[45] Date of Patent: Sep. 10, 1985

[54] HIGH SOLIDS, HIGH HEAT RESISTANT POLYESTER RESINS AND COATING COMPOSITIONS CONTAINING THE SAME

[75] Inventors: Conrad L. Lynch, Metuchen; Michael A. Tobias, Bridgewater, both of N.J.

[73] Assignee: The Valspar Corporation, Minneapolis, Minn.

[21] Appl. No.: 610,211

[22] Filed: May 14, 1984

[51] Int. Cl.$^3$ ............................................. C08G 12/40
[52] U.S. Cl. .............................. 525/517.5; 528/295.5; 528/302; 560/90
[58] Field of Search ........................... 528/295.35, 302; 525/517.5; 560/90

[56] References Cited

U.S. PATENT DOCUMENTS

| | | | |
|---|---|---|---|
| 3,714,090 | 1/1973 | Lasher | 525/517.5 |
| 3,714,091 | 1/1973 | Lasher | 525/517.5 |
| 3,893,959 | 7/1975 | Layman | 528/295.3 |
| 3,928,420 | 12/1975 | Fang | 560/90 |
| 4,248,745 | 2/1981 | Laganis | 528/295.3 |

Primary Examiner—Lucille M. Phynes
Attorney, Agent, or Firm—James R. Haller

[57] ABSTRACT

The production of novel polyester resins is disclosed as is the preparation of high solids coatings and paints containing the same. The polyester resins are produced by reacting a mixture comprising:
  (a) A saturated fatty acid having from 8 to 18 carbon atoms in an amount between about 3 and about 8 percent;
  (b) A polyol in an amount between 40 and 50 percent, said polyol consisting of between about 55 and 75 percent of a triol with the remainder being a diol;
  (c) A polycarboxylic acid in an amount of about 45 to about 55 percent, said polycarboxylic acid consisting of between 65 and 75 percent of an aromatic polycarboxylic acid with the remainder being aliphatic acid having from 4 to 10 carbon atoms.

The coatings and paints are preferably prepared by reacting the polyester resin with an aminoplast resin to cause cross-linking.

8 Claims, No Drawings

4,540,751

HIGH SOLIDS, HIGH HEAT RESISTANT POLYESTER RESINS AND COATING COMPOSITIONS CONTAINING THE SAME

BACKGROUND OF THE INVENTION

During recent years there has been substantial impact on industrial finishing brought about by the environmental movement. Legislation and stringent regulations have been enacted limiting the amounts and kinds of volatile organic liquids that can be emitted during industrial finishing operations and curing of coatings. As a means of meeting these new strict standards, there has been considerable investigation into the development of polyester resins which can be formulated into high solids coatings and paints. It is to the production of such high solids polyester resins, coatings and paints that the present invention is directed.

BRIEF DESCRIPTION OF THE INVENTION

The present invention relates to high solids, high heat resistant polyester resins and coating compositions and paints produced therefrom displaying excellent application properties. The polyester resins of the present invention can be prepared by combining specific types of multifunctional monomers in specific proportions with low levels of monofunctional carboxylic acids. The multifunctional monomers and monofunctional carboxylic acid are, per se, known in the art. They are described, for example, in U.S. Pat. No. 3,714,090 to Edward A. Lasher, issued Jan. 30, 1973, and the disclosure of that patent is incorporated herein by reference. The polyester resin of this invention are produced by heating a reaction mixture comprising (a) a fatty acid, (b) a polyol moiety consisting of both a triol and a diol and (c) a polycarboxylic acid moiety consisting of both an aliphatic and an aromatic polycarboxylic acid to a temperature and for a sufficient time to esterify the reactants. It has been found that in order to produce a polyester resin which can be formulated into a high solids coating or paint, the reactants as herein described must be employed in the following amounts:

(a) a saturated fatty acid having from 8 to 18 carbon atoms in an amount between about 3 and about 8 percent;

(b) a polyol in an amount between 40 and 50 percent, said polyol consisting of between about 55 and 75 percent of a triol with the remainder being a diol;

(c) a polycarboxylic acid in an amount of about 45 to about 55 percent, said polycarboxylic acid consisting of between 65 and 75 percent of an aromatic polycarboxylic acid with the remainder being aliphatic acid having from 4 to 10 carbon atoms.

It is important that the polyesters of the present invention have a final hydroxyl number of about 75 to about 175.

DETAILED DESCRIPTION OF THE INVENTION

As indicated above, the saturated fatty acids utilized in the present invention have from 8 to 18 carbon atoms. Included, therefore, are lauric acid, myristic acid, palmitic acid and stearic acid. Mixtures of these acids can be utilized.

The polycarboxylic acid employed in the present invention is a mixture of one or more aromatic polycarboxylic acids with one or more aliphatic polycarboxylic acids. As used herein, the term "polycarboxylic acid" refers to the acids themselves as well as the corresponding anhydrides of such acids. The aromatic polycarboxylic acids include orthophthalic acid, isophthalic acid, terephthalic acid, and tetrahydrophthalic acid, for example.

The aliphatic polycarboxylic acids employed in the present invention having from 4 to 10 carbon atoms include, for example, succinic, glutaric, adipic, suberic, azelaic and sebacic acids.

The polyester-forming monomers are esterified in a reaction which is normally carried out at temperatures between about 300° F. and 450° F. for a period of time ranging between about 3 hours and about 10 hours. The conventional catalysts for the promotion of esterification reactions, such as dibutyltin oxide, dibutyltin dilaurate or triphenyl phosphite can be used in catalytic amounts of about 0.01 to 1.0 percent by weight. During the reaction it is advantageous to remove the water evolved. This can be done in the conventional manner by means of a suitable trap which condenses and draws off water vapors by azeotropic distillation with toluene or xylene or by flushing the reactor with an inert gas to sweep the vapors away from the reactants.

The polyesters prepared in accordance with this invention having a hydroxyl number of about 75 to about 175 are generally of relatively low molecular weight of the order of about 500 to about 1500 and thus are especially suitable for the preparation of high solids coatings and paints. The term "high solids" as employed herein with regard to coatings and paints is intended to mean coatings with about 75 weight percent non-volatile material (weight solids) or higher and a maximum of about 25 percent volatile organic solvents. The polyesters result in coatings which have an outstanding combination of hardness, adhesion, extendibility, flexibility, and resistance to high temperatures. To prepare a coating composition and paints, the polyester resin is generally combined with an aminoplast resin, an acid catalyst and an inert organic solvent.

The aminoplast resin serves to cross-link the polyester composition. A variety of such materials are well known in the art and are commercially available. Generally, the aminoplast resin is an urea-aldehyde resin, a melamine-aldehyde resin, a dicyandiamide-aldehyde resin or a triazine-aldehyde. Other suitable aminoplast resins may be employed, for example, those disclosed in the Lasher patent referred to above.

The aminoplast resin is generally reacted with the polyester resin in an amount of about 7% to about 30% by weight of aminoplast resin based on the weight of the polyester resin and the aminoplast resin.

The acid catalyst can be any of the acids well known for curing aminoplast systems. For example p-toluene sulfonic acid, benzene sulfonic acid or methyl sulfonic acid can be used.

The suitable solvents include aromatic hydrocarbons such as toluene, xylene and aromatic petroleum cuts; ketones such as methyl isobutyl ketone; alcohols such as butanol; and ether alcohols such as butyl carbitol.

Generally the coating compositions are pigmented. The preferred white pigment is titanium dioxide.

The invention is illustrated by the following non-limiting example.

EXAMPLE

1. A five-liter round bottom flask was charged with 969.3 g of neopentyl glycol, 457.3 g of trimethylolpropane, 457.3 g of adipic acid and 152.3 g of lauric acid. It was heated to 140° C. under nitrogen at which time 1164.2 g of phthalic anhydride and 3.2 g of dibutyltin oxide were added. The reaction vessel contents were then heated to 160° C., where distillation of water began. Removal of water was continued until a temperature of 225° C. was attained, and this temperature was maintained until an acid number of 10.1 was achieved. The reaction product was the reduced to 74.4% non-volatiles with Butyl Cellosolve to afford a material with a Gardner-Holt viscosity of Z4-, an acid number of 8.2, a hydroxyl number of 120, a weight per gallon of 9.14, and a Gardner color of 1.

2. Paint was made from the resin solution from Item 1 by combining it with 11% of hexamethoxymethyl melamine crosslinker on resin solids, pigmenting it with Ti-Pure R902 $TiO_2$ pigment at a 1/1 pigment/resin solids ratio and reducing it to 75.6% non-volatile material with methyl isobutylketone. It was catalyzed with 0.6% of a 20% para toluene sulfonic acid solution in isopropyl alcohol based on the resin solids. This paint was coated on 20 mil cold rolled steel at 0.9 mils dry film thickness and baked at 177° C. for 15 minutes. The baked paint film had a 90 gloss, a B-HB pencil hardness, and showed only slight cracking on a 120 in-lb. reverse impact. When rebaked at 233° C. for 30 minutes, the coating showed only slight color change ($\Delta E = 2.7$) and loss of gloss (90 to 81).

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. The polyester resin obtained by the esterification of:
   (a) a saturated fatty acid having 8 to 18 carbon atoms in an amount by weight between about 3 and about 8 percent of the total weight of (a), (b) and (c);
   (b) a polyol in an amount by weight between about 40 and about 50 percent, said polyol consisting of between about 55 and 75 percent of a triol with the remainder being a diol; and
   (c) a polycarboxylic acid in an amount of about 45 to about 55 percent, said carboxylic acid consisting of between 65 and 75 percent of an aromatic polycarboxylic acid with the remainder being an aliphatic polycarboxylic acid having from 4 to 10 carbon atoms, said polyester resin having a hydroxyl number from about 75 to about 175.

2. The polyester resin of claim 1, wherein said triol is selected from the group consisting of glycerine, trimethylol ethane, trimethylol propane, trimethylol butane, hexanetriol and pentanetriol.

3. The polyester resin of claim 1, wherein said diol is selected from the group consisting of ethylene glycol, 1,2- and 1,3-propylene glycol, 1,3- and 1,4-butylene glycol, 1,5-pentane diol, 1,6-hexane diol, cyclohexane dimethanol, 2-ethyl, 2-methyl, 1,3-propane diol, neopentyl glycol, diethylene glycol and dipropylene glycol.

4. The polyester resin of claim 1, wherein said aromatic polycarboxylic acid is selected from the group consisting of orthophthalic acid and isophthalic acid.

5. The polyester resin of claim 1, wherein said aliphatic polycarboxylic acid is selected from the group consisting of succinic, glutaric, adipic, suberic, azelaic and sebacic acids.

6. A high temperature-resisting coating composition obtained by the reaction of the polyester resin of claim 1 with an aminoplast resin in an amount from about 7 to about 30 percent by weight of the weight of said polyester and aminoplast resins and a solvent therefor.

7. The composition of claim 6 which contains pigment.

8. An article coated with the composition of claim 6 in which the coating has been cured by cross-linking.

* * * * *